United States Patent [19]

Shimko

[11] 4,235,726

[45] Nov. 25, 1980

[54] AUTOMATIC GREASE SEPARATING APPARATUS

[75] Inventor: Dalton L. Shimko, Hewitt, N.J.

[73] Assignee: Baker-Waldeck Associates, Montville, N.J.

[21] Appl. No.: 19,400

[22] Filed: Mar. 12, 1979

[51] Int. Cl.² .............................................. B01D 21/24
[52] U.S. Cl. ..................................... 210/523; 210/923
[58] Field of Search .............. 210/523, 525, 527, 538, 210/540, DIG. 25, DIG. 26

[56] References Cited

U.S. PATENT DOCUMENTS

| | | | |
|---|---|---|---|
| 1,573,085 | 2/1926 | Meiani | 209/173 |
| 2,752,040 | 6/1956 | Schreiber et al. | 209/173 |
| 2,763,335 | 9/1956 | Janssen | 210/538 |
| 3,338,414 | 8/1967 | Lefke et al. | 210/523 X |
| 3,536,199 | 10/1970 | Cornelius | 210/523 X |
| 3,576,257 | 4/1971 | Yates | 210/242 |
| 3,612,277 | 10/1971 | Van Stayern et al. | 210/83 |
| 3,617,556 | 11/1971 | Cole et al. | 210/30 |
| 3,693,805 | 9/1972 | Tillett et al. | 210/519 |
| 3,804,251 | 4/1974 | Farrell et al. | 210/83 |
| 3,905,902 | 9/1975 | Hoegberg et al. | 210/30 |
| 3,916,674 | 11/1975 | Miller et al. | 73/61.1 R |
| 4,021,344 | 5/1977 | Webb | 210/122 |
| 4,051,024 | 9/1977 | Lowe et al. | 210/30 A |

Primary Examiner—William A. Cuchlinski, Jr.
Attorney, Agent, or Firm—David A. Jackson

[57] ABSTRACT

A device for the separation and removal of grease from a grease-containing liquid which comprises a settling container, a grease collector assembly mounted within said container adapted to pivot into and out of contact with said liquid to separate said grease therefrom, and a grease removal assembly cooperating with said collector assembly to transport said grease out of said container and away from said liquid. The device of the invention is designed for applications requiring high-volume grease removal within a confined area.

16 Claims, 5 Drawing Figures

AUTOMATIC GREASE SEPARATING APPARATUS

BACKGROUND OF THE INVENTION

The present invention relates generally to grease separating devices, and more particularly, to such devices having particular applicability in industrial application of modest physical size such as food operations, hospitals and industrial plants, that generate grease as a waste product.

Most conventional grease separating devices comprise a settling container into which the grease is introduced, whereby the grease, having a lower specific gravity, rises to the top of the liquid and forms thereon a top or uppermost layer. Grease is then removed from the container, by manually skimming off the top layer, such as, by means of a bucket. Manual separation is a particularly unclean task, and the grease has a tendency to clog sewer lines.

The most pertinent prior art relating to grease separation comprises those devices useful in picking up oil spills and the like from ocean and inland water ways. Generally, devices of this type, such as that shown in U.S. Pat. No. 4,051,024 to Lowe et al, comprise a rotating cylinder or disc partially submerged in the oil-spilled water and a scraper means for scraping and removing the oil from the totating cylinder or disc. In some instances, the rotating cylinder or disc may be made from a material, such as polyethylene, that has a particular adsorptive affinity for oil and petroleum products. Similar theories of operation are disclosed in U.S. Pat. No. 3,576,257 to Yates and 3,536,199 to Cornelius. However, these devices are of excess complexity and size, and are primarily designed and useful for recovering oil from oil spills occurring in large bodies of water. Also, as these devices utilize a sealed rotating drum or cylinder, the available surface area of oil pickup is somewhat limited and incapable of achieving rapid, high volume grease separation within the confined spatial limitations of commercial land-based grease-generating establishments such as restaurants and the like.

Accordingly, it is believed that the present invention provides a unique solution to the problem of grease separation and removal in confined industrial environments.

SUMMARY OF THE INVENTION

In accordance with the present invention, a grease separating device is provided comprising a settling container having lateral end walls respectively defining an inlet port and an outlet port, a non-cylindrical grease collector assembly mounted within said container adapted to pivot about an axis parallel to said end walls, into and out of contact with said liquid to separate said grease therefrom, and a grease removal assembly communicating with said collector assembly to transport the separated grease away from the collector assembly and out of the settling container. The grease collector assembly comprises a collector plate that has an arcuate cross-section, and pivots in a vertical plane to alternately move into and out of contact with the grease-containing liquid. The collector plate is adapted to move relatively slowly into the liquid and relatively quickly away therefrom and unexpectedly enhances grease retrieval and transfer.

The present device also includes two resiliently biased doctor blades associated with the grease collector for removing grease therefrom and a grease removal trough associated therewith.

The present device also includes an inlet baffle assembly comprising paired, angular baffle plates which aid in the initial separation of the incoming grease from the grease bearing liquid, and prevent turbulent flow in the container, and an outlet baffle for preventing the flow of grease into the outlet means of the container. The base or floor of the settling container is preferably disposed at an incline and defines a downward slope in the direction of said outlet baffle in order to aid in the removal of solids from the grease-bearing liquid.

Accordingly, it is a principal object of the presen invention to provide a grease separating device especially useful in industrial applications of limited space which removes grease from waste fluid and prevents the grease from entering the plumbing system.

It is another object of the present invention to provide a device as aforesaid which automatically removes grease from a grease and water suspension in a settling container to an outside disposal area.

It is still another object of the present invention to provide a device as aforesaid which has a reduced size from typical industrial application grease interceptors.

It is yet another object of the present invention to provide a device as aforesaid which is inexpensive to manufacture and easy and economical to use.

Further objects and advantages will become apparent to those skilled in the art from the ensuing description which proceeds with reference to the accompanying figures.

DETAILED DESCRIPTION OF THE INVENTION

Figure 1:
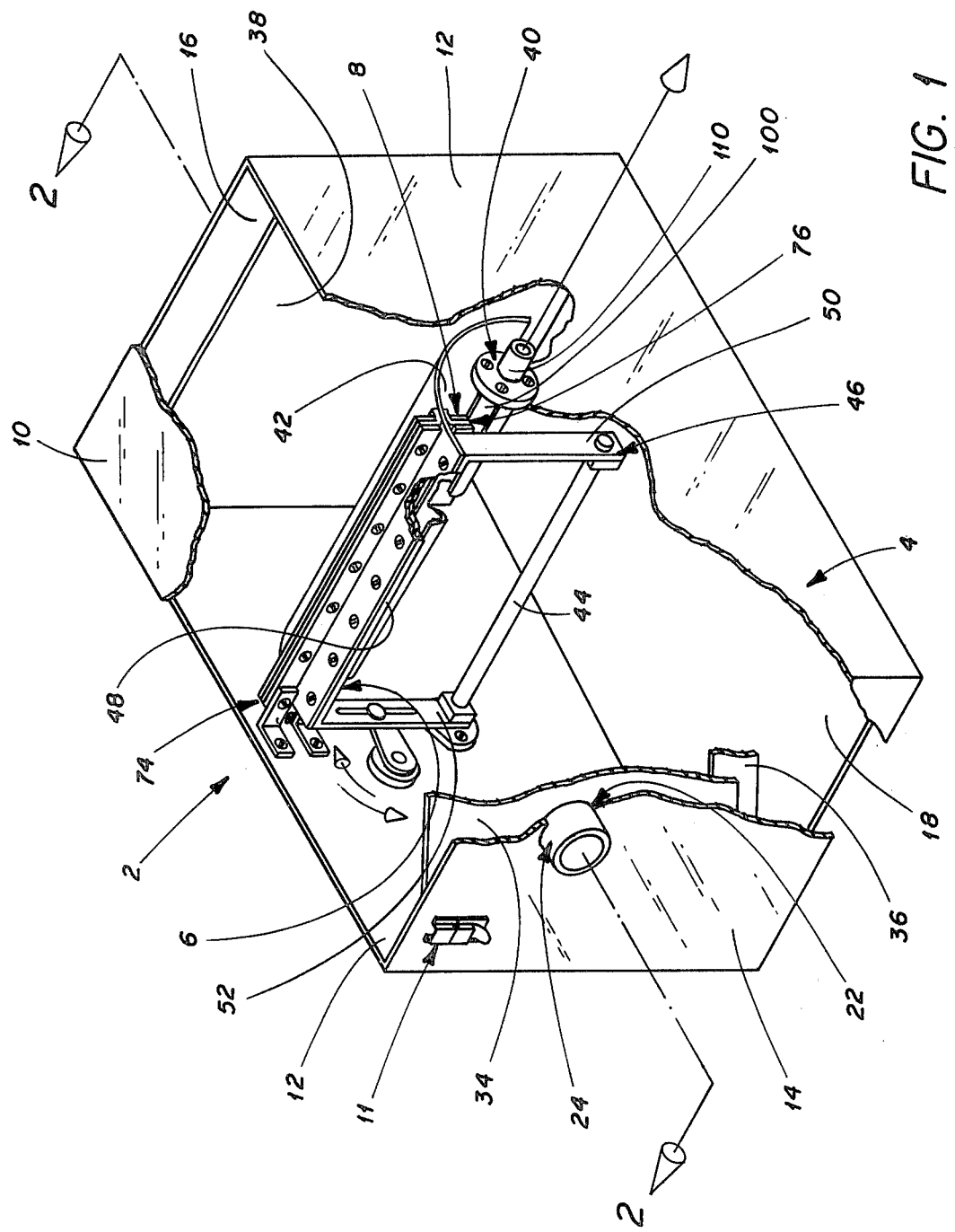
FIG. 1 is a perspective view of the present invention.

Referring to the drawings, wherein like numerals represent like parts, and particularly to FIG. 1, the grease separating device 2 of the present invention, shown in broken perspective, includes a settling container 4, a grease collector assembly 6 mounted within container 4 serving to separate the grease from the grease-containing liquid, not shown, and a grease removal assembly 8 mounted within container 4 in communication with collector assembly 6 to transport the separated grease away from collector assembly 6 and out of container 4.

It is to be noted that the present invention is not limited to the separation of grease from grease-containing liquids, but is applicable to the separation of a variety of oily materials from similar liquid suspensions, as the separation process is in essence a mechanical one. Thus, though the description and claims proceeds with reference to grease, it is to be understood that the device of the present invention is not limited thereto, but is, rather, applicable to the separation of oils, greases and fats of all origins.

Settling container 4 is preferably of a rectangular configuration and is fitted with a removable top 10, shown in broken perspective. Top 10 is seen more clearly in FIG. 2 and is adapted for air-tight engagement with container 4 to assist in controlling the rate of flow of the grease-containing liquid in the manner discussed with reference to the baffle assembly, hereinbelow. Top 10 may be held in position by a wide variety of disengageable clasping devices, such as latch assemblies 11, shown in FIG. 2 for purposes of illustration and not limitation.

Settling container 4 further includes longer longitudinal walls 12 and shorter lateral walls comprising inlet lateral wall 14 and outlet lateral wall 16, respectively. Container 4 further includes a floor or bottom wall 18, which is preferably inclined in a downward direction from inlet lateral wall 14 to outlet lateral wall 16. This incline assists in the separation of solids entrained in the grease-containing liquid, as the solids have a tendency to travel to the bottom of the container, and, without such an incline, would remain static adjacent the inlet lateral wall 14.

Figure 2:
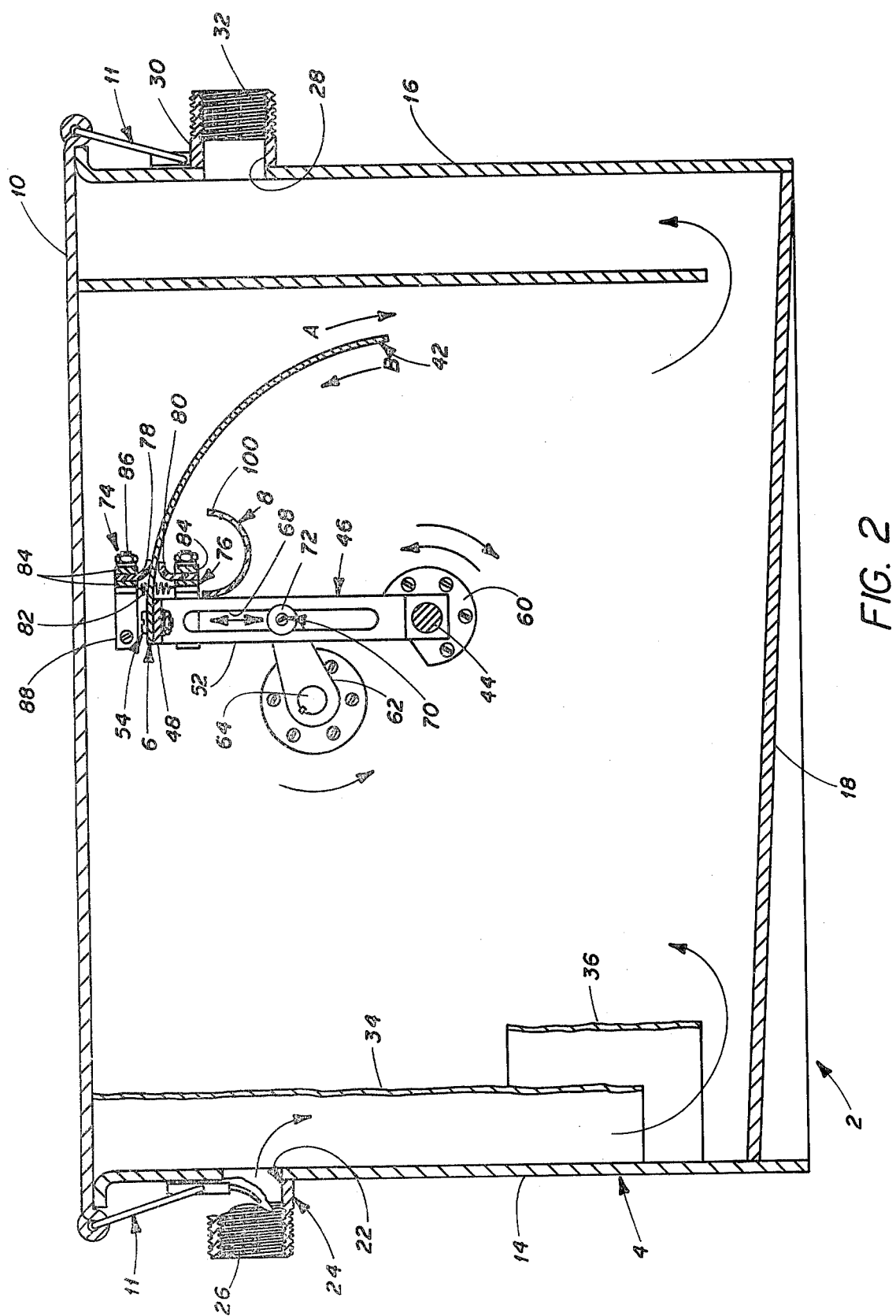
FIG. 2 is a side sectional view of the present invention along line 2—2 of FIG. 1.

Referring further to FIGS. 1 and 2, inlet lateral wall defines therein inlet port 22 provided for connection to an appropriate source of grease-containing liquid. Port 22 is adapted for connection to a plumbing system or the like by the provision of pipe stem 24 which, in a preferred embodiment, may be provided with screw threads 26, for threaded connection to an appropriate plumbing conduit. In similar fashion, illustrated in FIG. 2, outlet wall 16 defines an outlet port 28 provided with a pipe stem 30 which likewise may possess screw threads 32 for similar connection to a plumbing conduit or drain.

Referring further to FIGS. 1 and 2, container 4 includes a baffle assembly including two V-shaped inlet baffles comprising, respectively, a first large V-baffle 34 located proximate to inlet port 22, and a second small V-baffle 36 distally removed from V-baffle 34 and in closer proximity to floor 18. Both baffles 34 and 36 comprise essentially planar structures having a generally V-shaped horizontal cross-section. Baffle 34 extends from flush relationship with the topmost edge of lateral wall 14 downward to space apart relationship to floor 18, while small V-baffle 36 is of limited height but extends further downward than baffle 34, albeit into similar spaced-apart relationship with floor 18. The configuration and disposition of baffles 34 and 36 is an important feature of the device of the present invention. The location of baffle 34 results in a flush fitting engagement when top 10 is in the closed position, which accomplishes a controlled reduction in the flow rate of the grease-containing liquid, so that the separating device of the present invention may perform successfully under grease generation conditions previously requiring a separating device possessing as much as three times the grease-separating capacity. The present grease separating device is therefore capable of employment in high volume grease generating environments which, nonetheless, impose severe spatial restrictions on the installation of grease separating apparatus. Further, the employment of the incoming baffles 34 and 36 in the manner disposed also assists to initiate grease separation and, particularly, greatly facilitates the separation of solids frequently entrained in the grease-containing liquid.

Referring further to FIGS. 1 and 2, the baffle assembly employed in container 4 further comprises outlet baffle 38 which is a planar structure situated parallel and proximate to outlet wall 16. Like baffle 34, baffle 38 extends from flush relationship with walls 12 and top 10, when installed, down to spaced-apart, proximate relation to floor 18. Baffle 38 functions to permit the grease-free liquid to leave container 4 while trapping the grease which tends to remain toward the surface of the liquid, for separation and removal in the manner to be described later on.

Finally, in addition to inlet port 22 and outlet port 28, container 4 defines a grease removal port 40 located in a generally intermediate position within either of longitudinal walls 12. The exact location of port 40 is not critical and may vary with the displacement of collector assembly 6 and removal assembly 8, discussed hereinafter.

Figure 3:
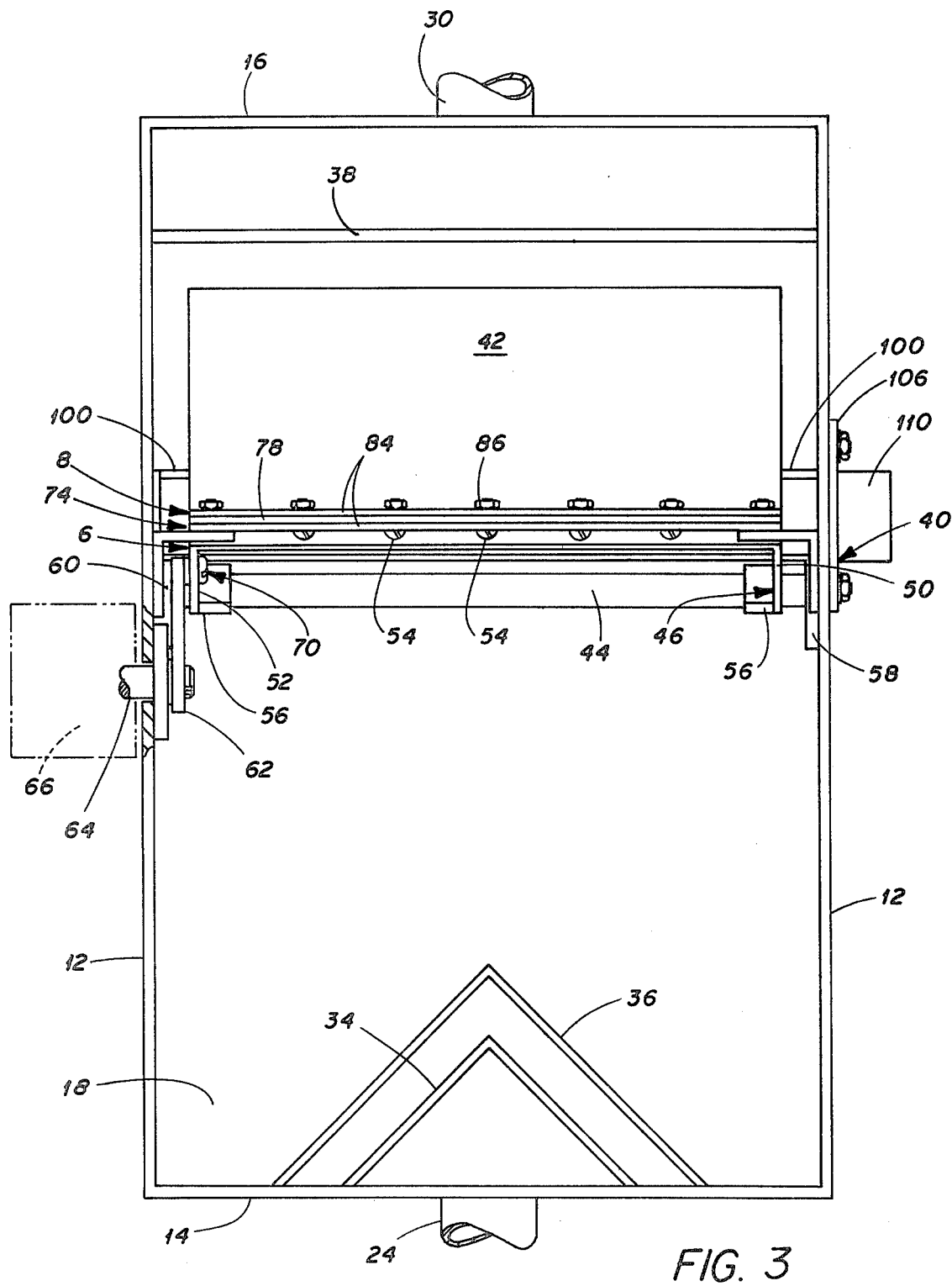
FIG. 3 is a top view of the present invention of FIG. 1, with the container cover removed.

Referring now to FIGS. 1-3, grease collector assembly 6 is mounted within container 4, and, as illustrated, may be situated fairly centrally therein. Specifically, collector assembly 6 is adapted to pivot about an axis rotatably mounted between the longitudinal walls 12, which axis is contained in a plane parallel to the planes containing lateral walls 14 and 16.

Collector assembly 6 comprises a generally planar collector plate 42 that has an arcuate cross-section and defines a concave surface. Plate 42 is adapted to pivot with its concave surface about horizontally disposed pivot axis 44, into and out of contact with the grease-containing liquid situated in container 4. As can be seen in the Figures, this pivoting action preferably takes place in the vertical plane, and plate 42 is thus adapted to move in the direction indicated by the arrow labeled A in FIG. 2 downward into substantially complete submergence within the grease-containing liquid, and subsequently upward in the opposite direction indicated by the arrow labeled B therein. In this manner, plate 42 comes in contact with the grease component of the grease-containing liquid, after which it withdraws, carrying on its surface a portion of the grease which is now ready for removal from container 4.

Plate 42 may be manufactured from a wide variety of materials generally inert to the corrosive forces that may exist in the grease-containing liquid, and may, for example, be prepared from such materials as stainless steel, as well as certain plastic materials. Further, plate 42 may optionally be prepared from a material having a specific adsorptive affinity for grease that would enhance grease pickup upon submergence within the grease-containing liquid. The choice of a particular material for the construction of plate 42, as well as other components of the device of the present invention may vary within the skill of the art and does not form a material part of the present disclosure.

Plate 42 is piovtally connected to pivot axis 44 by radial linkage 46 which can be seen in the Figures to comprise an essentially U-shaped strip defining a central support surface 48 and parallel radial arms 50 and 52. Collector plate 42 is illustrated in the Figures as attached to support surface 48 by means of screw-threaded nut and bolt assemblies 54, though it is contemplated that other well known forms of attachment such as rivets and the like, may be employed in accordance with the present invention. Radial arms 50 and 52 are provided at the free ends thereof with appropriate apertures journaled for the acceptance of axis 44, and are further provided with thickened support washers 56 which are permanently attached to the arms and appropriately journaled to give additional support and durability at the point of rotational attachment to axis 44. Axis 44 is itself rotatably mounted in fixed relation to walls 12 within bearing blocks 58 and 60 that may, in turn, be suitably affixed to walls 12 by conventional means such as bolts or the like.

Grease collector assembly 6 further includes a pivoting means comprising a rotatable driver arm 62 seen in the Figures to be mounted on one of the longitudinal walls 12 in radial displacement from axis 44 and in the direction of inlet wall 14. Referring to FIG. 2, driver arm 62 can be seen by the arrow to be adapted for a counterclockwise rotation and, in FIG. 3, is seen to have operative connection via shaft 64 to an appropriate rotation means 66 depicted in phantom, that may comprise any type of motor or the like providing rotational force. Preferably, the device of the present invention employs an electric motor, the size of which may vary depending upon the size of the device to be manufactured and used. Additionally, the present device may be fitted with an automatic motor actuation assembly, such as a timer or the like, that causes the motor to commence operation in sequence with other apparatus, such as dishwashing equipment, or merely in response to the passage of time. The provision of such automatic actuation is considered within the scope of the present invention.

The pivoting means of the present invention further includes a longitudinal slot 68 defined in radial arm 52 comprising the radial arm adjacent driver arm 62 which facilitates the slidable connection of arms 52 and 62. Thus a sliding connector 70 is provided which is fixedly attached to the distal end of driver arm 62 to slidably engage radial arm 52 within slot 68, whereby the full rotation of driver arm 62 causes radial arm 52 to pivot through an arc comprising the arcuate displacement of plate 42. Connector 70 may preferably include a rotatable bearing surface, not shown, to reduce friction between driver arm 62 and slot 68 in operation. As illustrated in FIGS. 2 and 3, connector 70, which may comprise a pin or the like, is shown to comprise a screw-threaded pin having a washer 72 situated on the side of radial arm 52 so as to form a sandwich relationship between arm 52 and arm 62 to securely position connector 70 within slot 68. The foregoing connection is shown for purposes of illustration only, as other types of slidable connection may be employed within the scope of the present invention.

The pivoting means of the present invention comprises another important feature thereof, as the displacement of the axis of rotation of driver arm 62 in relation to axis 44 and slot 68 determines the speed and extent of pivoting movement exhibited by radial arm 62. This serves to control both the speed and distance of movement or radial arm 52, and in accordance with the present invention, causes radial arm 52 to rotate at a controlled rate toward axis 64, which controlled rate is of greater magnitude than the controlled rate of rotation of radial arm 52 exhibited in the opposite direction. This control of rotation causes collector plate 42 to move down and dip into the grease-containing liquid relatively slowly, while rising out from said liquid at a relatively fast rate. Such action is advantageous to the operation of the collector assembly of the present invention, as the slow downward motion of plate 42 appears to create a surface current in its direction which brings the grease into contact therewith. Correspondingly, the relatively fast upward motion of plate 42 causes the grease adhering to plate 42 to fall into the grease removal trough described later herein, as a mass, with the result that undesired agglomeration or lumps of grease are broken up. Thus, the controlled rate of movement exhibited by collector plate 42 as a result of the linkage provided by the pivoting means of the present invention further enchances the efficient collection and separation of the grease from the grease-containing liquid.

Referring again to the figures, the invention further comprises a grease removal assembly 8 which is mounted within container 4 and is located adjacent the arc described by plate 42. Referring to FIGS. 1–3, assembly 8 is supported by one or more walls 12 and includes paired doctor blade assemblies comprising upper blade assembly 74 and lower blade assembly 76. Assemblies 74 and 76 make contact with the opposed broad surfaces of plate 42 and, in operation, serve to scrape the adhering grease from plate 42 as it moves upward from submergence in the grease-containing liquid. Blade assemblies 74 and 76, comprise, respectively, blade elements 78 and 80, which are preferably resilient materials such as rubber of polyethylene, to facilitate the deformation in contact with the surfaces or plate 42 to effectively remove the grease therefrom. Blades 78 and 80 are aided in their operation, as assemblies 74 and 76 are spring biased toward each other, by means such as spring connector 82, shown in FIG. 2. Thus, blades 78 and 80 are retained within rigid support bars 84 which extend the entire length thereof and, as illustrated in FIG. 3, may, for example, be held together by screws 86 or the like. The rigid structures resulting from the combination of support bars 84 and the respective blade elements are then mounted on L-shaped brackets 88 which, in turn, are pivotally mounted on walls 12. Thus, as discussed earlier, spring connectors 82 may be provided between respective L-shaped brackets 88 to urge blade assemblies 74 and 76 toward each other and into tensioned contact with the contiguous surfaces of plate 42. Though the preceding discussion has described the blade assemblies of the present invention as comprised of individual components including L-shaped bracket members, it is to be understood that the support structures for the blades 78 and 80 may comprise unitary structures including the L-shaped end members adapted for pivotal connection to longitudinal walls 12. Accordingly, the present invention should not be construed as limited to the illustrations and descriptions provided herein.

Figure 4:
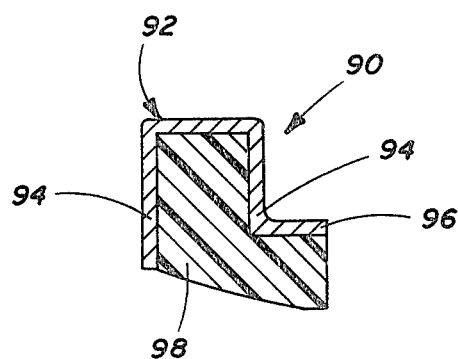
FIG. 4 is a cross-sectional view of a second embodiment of a doctor blade in accordance with the present invention.

In accordance with a further embodiment of the present invention, an alternate supported blade structure 90 is shown in FIG. 4 which comprises a unitary support bar 92 having a generally U-shaped cross-sectional configuration defined by substantially parallel arms 94, one of which flairs outward to form shoe 96, as shown. Blade material 98 is disposed within support bar 92 and extends in the direction of shoe 96 to define an approximately L-shaped cross-sectional configuration sloping at the free end thereof to a point. Blade structure 90 is particularly advantageous in design, as it confers greater resilience and durability in use without sacrificing the flexibility needed to achieve efficient grease removal.

Referring again to the Figures, and particularly to FIG. 2, upper blade assembly 74 is seen to be offset with respect to lower blade assembly 76, and in particular, is seen to ride in advance thereof along the respective surface of plate 42. The blade assemblies of the present invention are disposed in staggered relationship, with the upper blade assembly riding in advance of the lower blade assembly whereby lower assembly 76 remains in contact with the respective surface of palte 42 after the disengagement of upper assembly 74. This staggered relationship permits the grease being loosened from the upper surface of plate 42 by blade assembly 74 to drop into grease removal trough 100, while lower blade assembly 76, situated over trough 100 guides any remaining grease clinging to the edge of plate 42 along with the grease adhering to the contiguous surface of the plate into trough 100.

Figure 5:
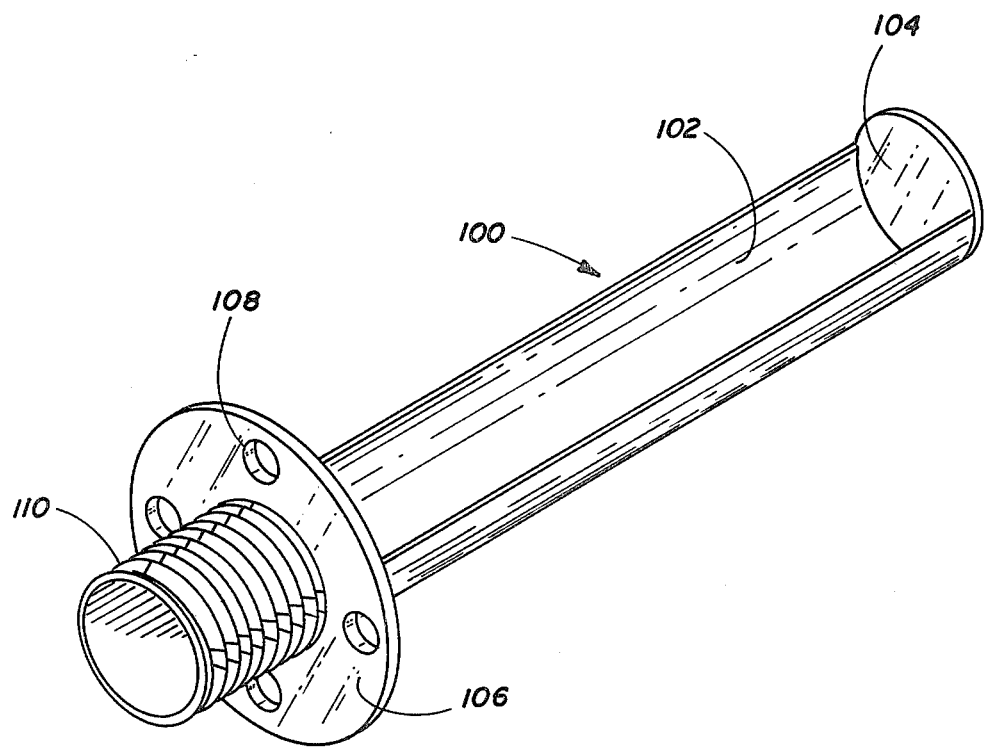
FIG. 5 is a perspective view of a grease removal trough in accordance with the present invention.

As noted above, grease removal trough 100 is a part of grease removal assembly 8 and comprises an elongated, opentopped, hollow structure disposed directly below lower blade assembly 76, whereby grease dropping from plate 42 by the action of the blade assemblies is deposited directly within trough 100. More particularly, and with reference to FIG. 5, trough 100 includes a hollow track 102 which defines at one end thereof an end plate 104 which seals off the interior channel of the trough. At the opposite end thereof, trough 100 terminates in a circular faceplate 106 for attachment to wall 12 of container 4 by mounting within grease removal port 40. Faceplate 106 is provided with appropriate attachment means 108, in this case comprising holes for screw-threaded attachment to wall 12. Grease removal trough 100 terminates beyond faceplate 106 in connector pipe 110 which may associate with any suitable conduit to a disposal area such as, for example, a grease sump or container, not shown herein.

As installed in container 4, trough 100 is shown to be situated in an inclined position directly below lower blade assembly 76 where it serves to receive the grease removed from the respective sides of plate 42 by the individual doctor blades. The inclined disposition of the trough in the direction of connector pipe 110 serves to conduct the separated grease out of container 4 by force of gravity. Trough 100 may be prepared from a wide variety of materials resistant to the corrosive environment of the grease-containing liquid, and, in one embodiment, is prepared from a synthetic resinous material such as polyvinyl chloride. Of course, the particular materials comprising the trough prepared in accordance with the present invention are not critical and can be varied within the skill of the art.

In operation, a grease containing liquid such as grease and water suspension enters container 4 through inlet port 22, and is directed downward by baffle 34 where, as noted earlier, fluid ingress is permitted at a controlled rate. Upon reaching baffle 36 any entrained solids will tend to settle on floor 18 where they will then move by gravity to the opposite end of container 4. The grease containing fluid will rise up to a level approximately commensurate with that of the collector assembly 6, and the oil or grease component of the liquid will tend to rise to the surface by virtue of the differential in specific gravity between it and the non-grease liquid component. Collector assembly 6 comprising collector plate 42 commences its pivoting action in a manner described earlier, whereby plate 42 first dips slowly into the liquid to achieve substantial submergence therein and then retracts relatively quickly therefrom. Doctor blade assemblies 74 and 76 maintain spring biased contact against surfaces of plate 42 and remove the adhered grease therefrom, and urges it to drop into trough 100 upon completion of the upward rotational cycle of plate 42, whereupon the grease is then caused by gravity to flow out of container 4 via connecting pipe 110. The resulting grease-free liquid is then permitted to leave container 4 through outlet port 28 at a controlled rate by passage under baffle 38. As noted earlier, top 10 is secured in operation to assure that the flow rates are controlled as indicated, however, top 10 may be removed when operation ceases to remove solid materials collected adjacent baffle 38.

The grease separating device of the present invention may be prepared in a wide variety of sizes and capacities depending upon the installation contemplated. Prior to the recommendation that a particularly sized separator device be installed in a given location, a determination is made of the liquid flow rate of that area in gallons per minute. Subsequently, a separating device may be installed which possesses a grease retention capacity in pounds equal to approximately twice the flow rate as determined in gallons per minute. This has been found to obtain in all installations and serves as a guide in assessing the requirement of a given grease generating environment.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirt and scope and defined by the claims.

What is claimed is:

1. A device for the separation of grease from a grease-containing liquid which comprises:
   a settling container,
   a pivotable non-cylindrical grease collector assembly mounted within said container adapted to pivot into and out of contact with said grease-containing liquid, and
   a grease removal assembly mounted within said container cooperating with said grease collector assembly to transport said grease away from said collector assembly and out of said settling container.

2. The device of claim 1 including an inlet port and an outlet port respectively mounted on opposed walls of said settling container, and a baffle assembly comprising inlet baffles and an outlet baffle located adjacent the respective port.

3. The device of claim 2 wherein said settling container is of generally rectangular shape defined, by longer longitudinal walls and shorter lateral walls disposed therebetween, and a floor extending between said longitudinal and lateral walls in leak-proof engagement therewith, said inlet port and outlet port are located on opposed lateral walls and said baffle assembly comprises two generally planar baffles having a generally V-shaped horiztonal cross-section, said baffle assembly comprising a first large V-baffle located proximal to said inlet port extending from flush relationship with the uppermost edge of said container into spaced-apart proximity with the bottom thereof, and a second small V-baffle essentially parallel to said first V-baffle and distally removed from said inlet port, said second V-baffle extending into closer spaced apart proximity with the floor of said container.

4. The device of claim 3 wherein said baffle assembly further includes a single, planar outlet baffle parallel and proximate to the lateral wall containing said outlet port, said outlet baffle extending from flush relationship with the uppermost edge of said container into proximate, spaced-apart relationship with said floor.

5. The device of claim 3 wherein said floor is inclined and slopes in the downward direction from said inlet port to said outlet port.

6. The device of claim 3 wherein said grease collector assembly pivots about an axis rotatably mounted between said longitudinal walls, and in a plane parallel to said lateral walls.

7. The device of claim 1 herein said container further includes a grease removal port located in intermediate disposition within one of said longitudinal walls.

8. The device of claim 1 wherein said grease collector assembly is adapted to pivot in the vertical plane into substantially complete submergence within said grease-containing liquid.

9. The device of claim 1 wherein said grease collector assembly comprises a generally planar collector plate having a curvilinear cross-section defining a concave surface, a pivot axis mounted within said settling container, and a radial linkage connecting said plate to said pivot axis, whereby said collector plate is adapted to pivot in the vertical plane.

10. The device of claim 9 further including means associated with said radial linkage for pivoting said plate into and out of contact with said liquid, said pivoting means causing said plate o pivot into contact with said liquid at a controlled rate of movement which is less than the rate of movement of said plate in the opposite direction.

11. The device of claim 10 wherein said radial linkage comprises paired radial arms connected at one end thereof to said plate, and rotatably mounted at the opposite ends thereof upon said pivot axis.

12. The device of claim 11 wherein said pivot means comprises a rotatable driver arm mounted in said container adjacent one end of said pivot axis and radially displaced therefrom in the direction of said inlet end, a longitudinal slot provided in said radial arm adjacent said driver arm, and a sliding connector fixedly attached to the end of said driver arm distal to its axis of rotation, said sliding connectors adapted to slidably engage said radial arm within said longitudinal slot, whereby the full rotation of said driver arm causes said radial arm to pivot through an arc comprising the arcuate displacement of said plate.

13. The device of claim 9 wherein said collector plate defines opposed broad surfaces, and said grease removal assembly is mounted within said container adjacent said broad surfaces and comprises paired doctor blade assemblies, said doctor blade assemblies resiliently biased toward each other into contact with said broad surfaces, and a grease removal trough located below the concave surface of said plate in an inclined position whereby grease entering said trough moves by gravity along said trough and out of said container.

14. The device of claim 13 wherein said doctor blade assemblies are pivotally mounted on opposed longitudinal walls and comprise a first upper blade assembly, and a second lower blade assembly said lower blade assembly mounted adjacent the concave surface of said blade, and said trough is located directly below said lower blade assembly and at an angle with respect thereto.

15. The device of claim 14 wherein said upper blade assembly is disposed in offset relationship with respect to said lower blade assembly, whereby said lower blade assembly remains in contact with said concave surface after the disengagement of said upper blade assembly, whereby said lower blade assembly assures that all of the grease removed from the upper surface of said plate is finally removed from the lower edge of said plate and guided into said trough.

16. A device for the separation of grease, oil and the like from liquids containing same which comprises:
- a generally rectangular settling container having opposed longitudinal and lateral walls,
- a non-cylindrical grease collector assembly mounted within said container and pivoting about an axis rotatably mounted between said longitudinal walls in a plane parallel to said lateral walls said collector assembly adapted to pivot into and out of contact with said liquid, and
- a grease removal assembly mounted within said container upon said longitudinal walls in cooperation with said grease collector assembly to remove said grease from said collector assembly and transport said grease out of said container.

* * * * *